United States Patent
Woodruff et al.

(10) Patent No.: US 9,550,240 B2
(45) Date of Patent: Jan. 24, 2017

(54) ROUND WIPER TOOTH AND FACE MILL INCORPORATING THE SAME

(71) Applicant: ROTARY TECHNOLOGIES CORPORATION, Rancho Dominguez, CA (US)

(72) Inventors: Douglas J. Woodruff, Atlantic Mine, MI (US); Gary W. Pennala, Calumet, MI (US); William J. Endres, Houghton, MI (US)

(73) Assignee: Rotary Technologies Corporation, El Segundo, CA (US)

( * ) Notice: Subject to any disclaimer, the term of this patent is extended or adjusted under 35 U.S.C. 154(b) by 201 days.

(21) Appl. No.: 14/242,680

(22) Filed: Apr. 1, 2014

(65) Prior Publication Data

US 2014/0294522 A1   Oct. 2, 2014

Related U.S. Application Data

(60) Provisional application No. 61/807,225, filed on Apr. 1, 2013, provisional application No. 61/807,285, filed on Apr. 1, 2013.

(51) Int. Cl.
*B23C 5/20* (2006.01)
*B23C 5/22* (2006.01)
(Continued)

(52) U.S. Cl.
CPC .............. *B23C 5/207* (2013.01); *B23B 27/12* (2013.01); *B23C 5/06* (2013.01); *B23C 5/22* (2013.01);
(Continued)

(58) Field of Classification Search
CPC ................... B23C 2200/045; B23C 2200/367; B23C 2210/168; B23C 2210/16; B23C 2210/165; B23C 5/06; B23C 5/22; B23B 2200/0461; B23B 2200/369; B23B 2205/04; B23B 27/12; Y10T 407/192; Y10T 407/1924; Y10T 407/1952
(Continued)

(56) References Cited

U.S. PATENT DOCUMENTS

| 2,678,487 A | 5/1954 | Onsrud |
| 3,670,380 A | 6/1972 | Moore et al. |
| 4,191,075 A | 3/1980 | Morgunsky et al. |

FOREIGN PATENT DOCUMENTS

| DE | 32 10 059 A1 | 9/1983 | |
| DE | EP 1561532 A2 * | 8/2005 | ........... B23C 5/2247 |

(Continued)

OTHER PUBLICATIONS

JP 08-052611 A Machine Translation, pp. 6-12; Feb. 5, 2016.*
(Continued)

*Primary Examiner* — Sunil K Singh
*Assistant Examiner* — Nicole N Ramos
(74) *Attorney, Agent, or Firm* — Lewis Roca Rotherger Christie LLP

(57) ABSTRACT

A milling tool includes a body which is rotatable about a first axis. At least one cutting tooth mounted on the body having a cutting edge for cutting about the first axis. A wiper tooth extends from the mill body. The wiper tooth includes at least at a portion having a peripheral surface about the second axis and the peripheral surface intersects a face surface defining a cutting edge that is round about the second axis for cutting about the first axis. In some embodiments, the peripheral surface, the face surface and the cutting edge are formed on an insert that is mounted the mill body.

21 Claims, 7 Drawing Sheets

(51) Int. Cl.
  *B23C 5/06* (2006.01)
  *B23C 5/24* (2006.01)
  *B23B 27/12* (2006.01)

(52) U.S. Cl.
  CPC ........... *B23C 5/2472* (2013.01); *B23C 5/2475* (2013.01); *B23C 2200/045* (2013.01); *B23C 2200/32* (2013.01); *B23C 2200/367* (2013.01); *B23C 2210/16* (2013.01); *B23C 2210/166* (2013.01); *B23C 2210/168* (2013.01); *B23C 2265/16* (2013.01); *Y10T 407/192* (2015.01); *Y10T 407/1924* (2015.01)

(58) Field of Classification Search
  USPC ....... 407/33–34, 40, 42, 46–49, 51, 61, 101, 407/108–109
  See application file for complete search history.

(56) References Cited

FOREIGN PATENT DOCUMENTS

| JP | 52022183 A | * | 2/1977 |
| JP | H06-210512 A | | 8/1994 |
| JP | 07223108 A | * | 8/1995 |
| JP | 08052611 A | * | 2/1996 |
| JP | 2002-144130 A | | 5/2002 |
| JP | 2013027947 A | * | 2/2013 |

OTHER PUBLICATIONS

JP 07-223108 A Machine Translation, pp. 3-5; Feb. 5, 2016.*
EP 1 561 532 A2 Machine Translation, pp. 7-12; Feb. 5, 2016.*
International Search Report and Written Opinion of the International Searching Authority dated Aug. 22, 2014, for International Application PCT/US2014/032572; 14 Pages.

* cited by examiner

Wiper Cutting Direction

ROUND WIPER TOOTH AND FACE MILL INCORPORATING THE SAME

CROSS-REFERENCE TO RELATED APPLICATION

This application claims priority to and the benefit of Provisional Application No. 61/807,285, filed on Apr. 1, 2013, and Provisional Application No. 61/807,225, filed on Apr. 1, 2013, the entire disclosure of which is incorporated herein by reference.

BACKGROUND

In one embodiment, the present disclosure addresses the need for improving the surface finish—reducing the surface roughness—of surfaces created on a work piece by a face milling tool. A face milling tool, also known as a face mill, has one or, more generally, multiple primary cutting teeth affixed to a face mill body around the face mill body circumference, generally substantially equally spaced, and aligned to one another in both the axial and radial dimensions of the face mill. Each primary cutting tooth is generally made up of a replaceable cutting insert and has provisions for attachment to the face mill body. A face mill is operated by attaching it to a spindle of a machine tool. The spindle rotates to produce a cutting motion at a relatively high cutting speed, also referred to herein as the tangential speed, while the machine provides a feeding motion of the work piece or the face mill, relative to the other, that occurs in the plane to which the spindle axis is perpendicular. The face mill removes a shallow layer of material from the work piece creating, with the tips of the primary cutting teeth, a new surface on the work piece that is substantially parallel to the plane of the feeding motion. Upon that surface and at a smaller, microscopic scale is the surface roughness. The surface roughness is comprised of a series of radiused feed grooves that trace the nearly-circular cutting motion of the primary cutting teeth. The feed grooves exhibit cusps/peaks occurring where adjacent feed grooves overlap one another leaving the radiused valleys of the feed grooves between the cusps/peaks.

The feeding action may be quantified as a distance traveled in the time it takes for one revolution of the face mill, referred to as the feed per revolution. Of greater significance as related to surface roughness is the feed per primary tooth, which is the feed per revolution divided by the number of primary cutting teeth affixed to the face mill cutter body. The feed per primary tooth dictates the distance between the microscopic peaks—the widths of the feed grooves.

Surface roughness may be characterized by one or more of numerous quantitative parameters, such as the roughness average value that is generally referred to as $R_a$. Ideally, the roughness average value is proportional to the square of the feed per primary tooth and inversely proportional to the radius on the tips of the primary cutting teeth. In practice the roughness average value will exhibit these types of proportional and inversely proportional trends; however, because the multiple primary cutting teeth are not perfectly aligned with one another, the roughness average value in practice will always be higher (a rougher surface) than the ideal value. While the radial misalignments of the primary cutting teeth have a deleterious effect on surface roughness by perturbing the widths of the feed grooves from their ideally equal widths, the axial misalignments of the primary cutting teeth have an even greater deleterious effect on surface roughness by also perturbing the depths of the feed grooves relative to their ideally equal depths.

Thus, four parameters combine to impact the surface roughness—feed per primary tooth, tool tip radius (often referred to as the corner radius, or sometimes the nose radius), tooth-to-tooth axial misalignments, and tooth-to-tooth radial misalignments. Assuming one has reduced the misalignments to be as small as possible by applying the degree of effort that can be afforded, it is the feed per primary tooth and the corner radius that are adjusted to achieve the desired/specified surface roughness on a face milled surface. Decreasing the feed per primary tooth, due to its squared effect on the average roughness ($R_a$), has the greater impact on decreasing/improving (making more smooth) the surface roughness, but, holding all other cutting conditions constant, such as spindle speed, this also results in a proportionate decrease in productivity. Increasing the corner radius will result in a proportionate decrease/improvement in surface roughness, but it also tends to direct a larger percentage of the cutting forces acting between the primary cutting teeth and the work piece into the axial direction, which can lead to structural deflections that result in dimensional error in the location of the face milled surface produced.

When producing a machined surface, it is common to take multiple passes, including one or more roughing passes to more rapidly remove larger amounts of material without concern for the aforementioned dimensional error or higher surface roughness, followed by a finish pass at a lower rate of material removal to facilitate meeting the dimensional and surface roughness requirements. To achieve particularly low surface roughness without excessively reducing the feed per primary tooth and, likewise, in the presence of some level of tooth-to-tooth misalignments that always exist in practice, one or more secondary "wiper" teeth may be added to the face mill. When viewed in the direction that is tangential to the face mill body (the cutting motion direction), wiper teeth have either a straight cutting edge or a cutting edge with a very large radius or "crown" that is much larger than the corner radius of the primary cutting teeth. Wiper teeth serve to remove the cusps/peaks of the surface roughness geometry. Because $R_a$ is inversely proportional to the radius of the cutting edge, and the radius of the wiper is either very large (or infinite in the case of a non-radiused/ straight wiper tooth cutting edge), the wiper can create a much smaller $R_a$ value even if the feed per wiper tooth is larger than the feed per primary tooth. Of course, if there is more than one wiper tooth, the multiple wiper teeth must be carefully aligned in the axial direction, and for that reason, there are generally far fewer wiper teeth than primary cutting teeth, which is consistent with the ability to accommodate higher feed per wiper tooth than feed per primary tooth.

Wiper teeth, or rather the indexible cutting insert that makes up the cutting portion of the wiper tooth, are usually common-size square or rectangular cutting inserts made from one of the many cutting insert materials (e.g., tungsten carbide, ceramic, cubic boron nitride, etc., either with or without a coating) that are well known to those working in the field. Viewing in the direction of the axis of the face mill, the wiper tooth cutting edge is substantially straight and has finite length. Wiper teeth are set with their cutting edge length running substantially radially outward from the axis of the face mill. They are set at an axial position on the cutter body so the wiper cutting edge protrudes axially toward the machined surface just slightly more than the furthest protruding primary cutting tooth. The added protrusion of a wiper tooth may be up to approximately 0.003 inch (75 micron), sometimes less and sometimes more; it is desired to keep this added protrusion, or wiper depth, as small as possible while still assuring the wiper removes the entirety of all the cusps/peaks down to the lowest of the feed groove valleys. When a wiper has a non-radiused straight cutting edge, the wiper teeth may be set to have a very small angle relative to the feed plane so that the full, and generally excessive (relative to the feed per wiper tooth), length of the wiper tooth's cutting edge is not continuously rubbing on the machined surface that was wiped by a previous wiper tooth passing over that part of the surface.

While a face mill having wiper teeth may have them in addition to a full complement of evenly spaced primary cutting teeth, most face mills having wiper teeth replace some of the primary cutting teeth with a wiper tooth. While this is convenient and is easy to accomplish given the limited space available between successive primary cutting teeth, replacing some of the primary cutting teeth results in the primary cutting tooth that follows that replaced primary cutting tooth position to realize twice the nominal feed per primary tooth. As such it removes double the nominal amount of material, which can cause those primary cutting teeth to wear more quickly than the others.

Generally, a wiper tooth has a means of axial adjustment so that the wiper teeth can be adjusted to the desired wiper depth (relative to the furthest axially protruding primary cutting tooth) and, in the case of multiple wiper teeth, adjusted to be well aligned with all other wiper teeth. It is common, though without restriction, for there to be one wiper tooth for every three to eight primary cutting teeth.

SUMMARY OF THE INVENTION

In an example embodiment a milling tool is disclosed. The milling tool includes a body which is rotatable about a first axis. At least one cutting tooth is mounted on the body having a, cutting edge for cutting about the first axis. A wiper tooth extends from the mill body. The wiper tooth includes a round wiper cutting insert which is round about a second axis. The wiper tooth cutting insert has a peripheral surface about the second axis and the peripheral surface intersects a face surface defining a cutting edge that is round about the second axis for cutting about the first axis. In another example embodiment, the wiper cutting insert face extends along a first plane offset at an angle relative to a second plane perpendicular to the first axis, and the angle is formed along a third plane perpendicular to the first and second planes. In yet another example embodiment, the milling tool further includes a radius extending from the first axis and being tangent to the wiper cutting insert cutting edge. In this example embodiment, the third plane is along a diameter of the wiper tooth cutting insert, and the third plane is also at a third plane angle relative to the radius such that the third plane angle extends from being perpendicular to the radius to an angle less than 90° as measured in a direction radially outward along the radius. In a further example embodiment, the third plane intersects the cutting edge at a point which is furthest axially from the second plane than any other point on the cutting edge. In one example embodiment, the angle is in the range of greater than 0° to 10°. In yet a further example embodiment, the wiper insert is circular and is rotatable about the second axis. In yet another example embodiment, the wiper insert is circular and fixed about the second axis. In one example embodiment, the wiper tooth cutting insert includes a first annular section adjacent a second annular section defining an opening through both sections. The first annular section includes a first outer surface having a first outer diameter and a second inner surface opposite the first outer surface and having a second inner diameter, and the second annular section includes a third outer surface having a third outer diameter and a fourth inner surface opposite the third outer surface and having a fourth diameter, such that the third diameter is greater than the second diameter but smaller than the first diameter, and the fourth diameter is smaller than the second diameter, such that a seat is defined between the second and fourth inner surfaces and the first outer surface is the peripheral surface. In another example embodiment, the milling tool also includes a stud coupled to the mill body and penetrating the wiper tooth opening, and a retention nut. The retention nut includes a first annular section having an outer surface and a second annular section coaxial with the retention nut first annular section having an outer surface and defining an opening through the retention nut. A diameter of the outer surface of the retention nut second annular section is smaller than a diameter of the retention nut first annular section outer surface. The first annular section extends radially beyond the second annular section defining a face there-between, and the retention nut is fitted in the opening of the wiper tooth insert with the retention nut first annular section outer surface being adjacent to the second inner surface and the retention nut second annular section outer surface being adjacent to the fourth inner surface for retaining the wiper insert on the mill body. In yet another example embodiment, the mill body includes a threaded bore, and the stud extends from a seat that is threaded into the threaded bore. With this embodiment, the milling tool also includes an insert seat having an inner surface penetrated by the stud and an outer surface threaded to the bore, the insert seat defining a receptacle receiving the wiper tooth insert second section. A gear is coupled to the body and to the insert seat, wherein rotation of the gear causes the seat rotate relative to the bore and translate relative to the stud for adjusting the position of the wiper tooth cutting insert relative to the stud. In one example embodiment, the first gear rotates about an axis transverse to the axis of rotation of the insert seat relative to the stud. In a further example embodiment, the tool also includes a seal sandwiched between the retention nut face and the wiper tooth insert seat. In another example embodiment, the wiper tooth insert is rotatable about the second axis during operational milling use of the milling tool. In yet another example embodiment, the retention nut is threaded onto the stud. In one example embodiment, the wiper tooth cutting insert is fastened to the mill body with a fastener penetrating through an opening formed through the wiper tooth insert.

In yet a further example embodiment, the milling tool includes a body which is rotatable about a first axis. At least one cutting tooth is mounted on the body having a cutting edge for cutting about the first axis. A wiper tooth extends from the mill body. The wiper tooth includes at least at a portion having a peripheral surface about the second axis and the peripheral surface intersects a face surface defining a cutting edge that is round about the second axis for cutting about the first axis. In another example embodiment, the wiper cutting insert face extends along a first plane offset at an angle relative to a second plane perpendicular to the first axis, and the angle is formed along a third plane perpendicular to the first and second planes. In yet another example embodiment, the milling tool further includes a radius extending from the first axis and being tangent to the wiper tooth cutting edge. In this example embodiment, the third plane is along a diameter of the wiper tooth cutting edge, and the third plane is also at a third plane angle relative to the radius such that the third plane angle extends from being perpendicular to the radius to an angle less than 90° as measured in a direction radially outward along the radius. In a further example embodiment, the third plane intersects the cutting edge at a point which is furthest axially from the second plane than any other point on the cutting edge. In one example embodiment, the angle is in the range of greater than 0° to 10°.

DETAILED DESCRIPTION

Figure 1:
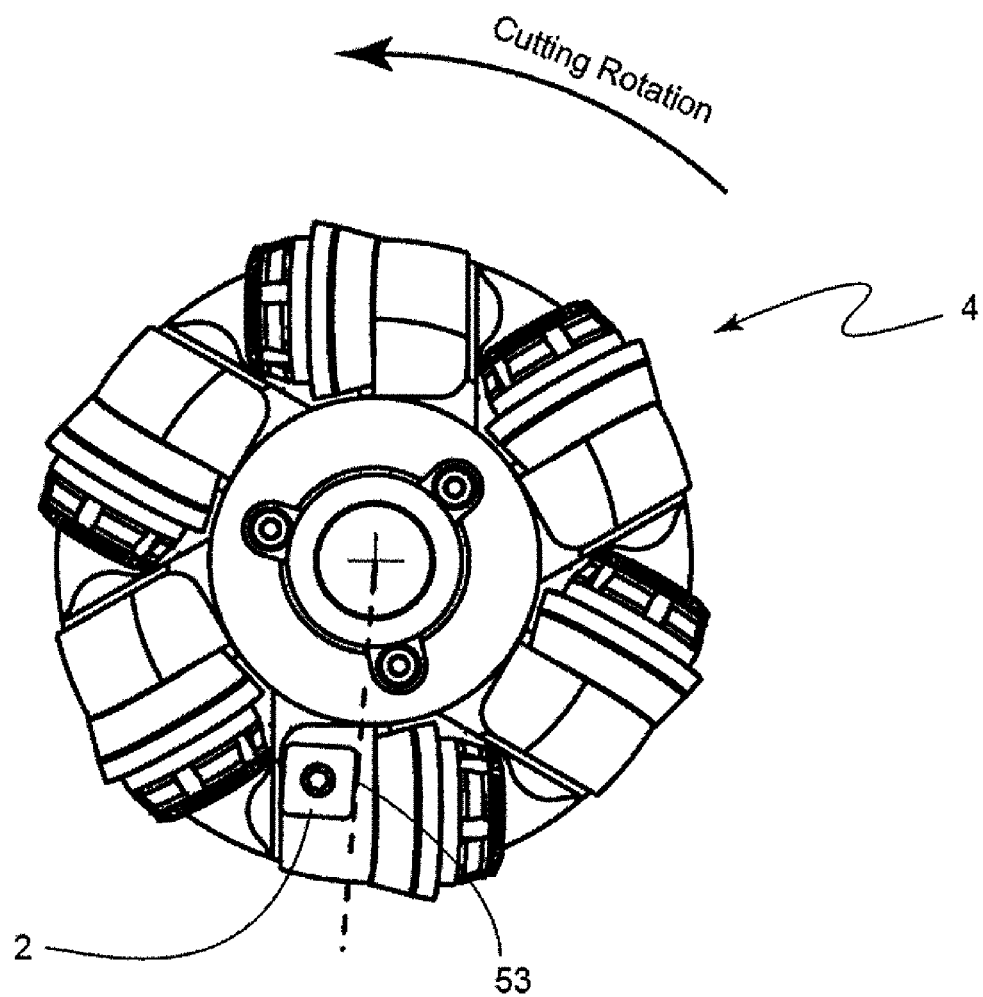
FIG. 1 is an end view of a face mill.
Figure 2:
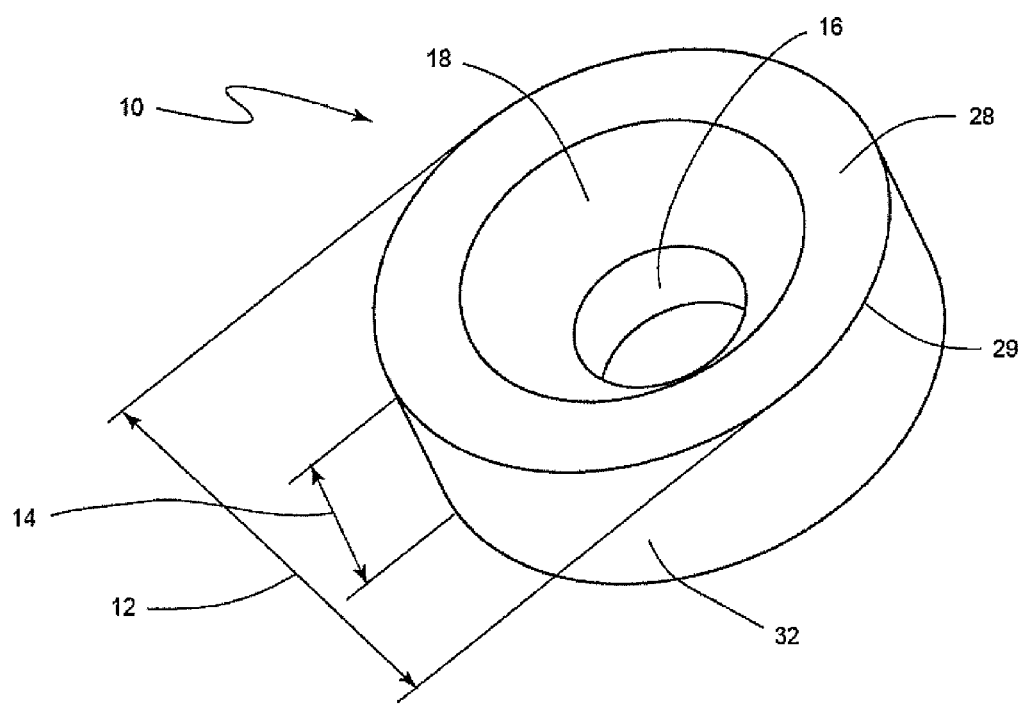
FIG. 2 is perspective view of a round wiper cutting insert of an example embodiment.
Figure 3A:
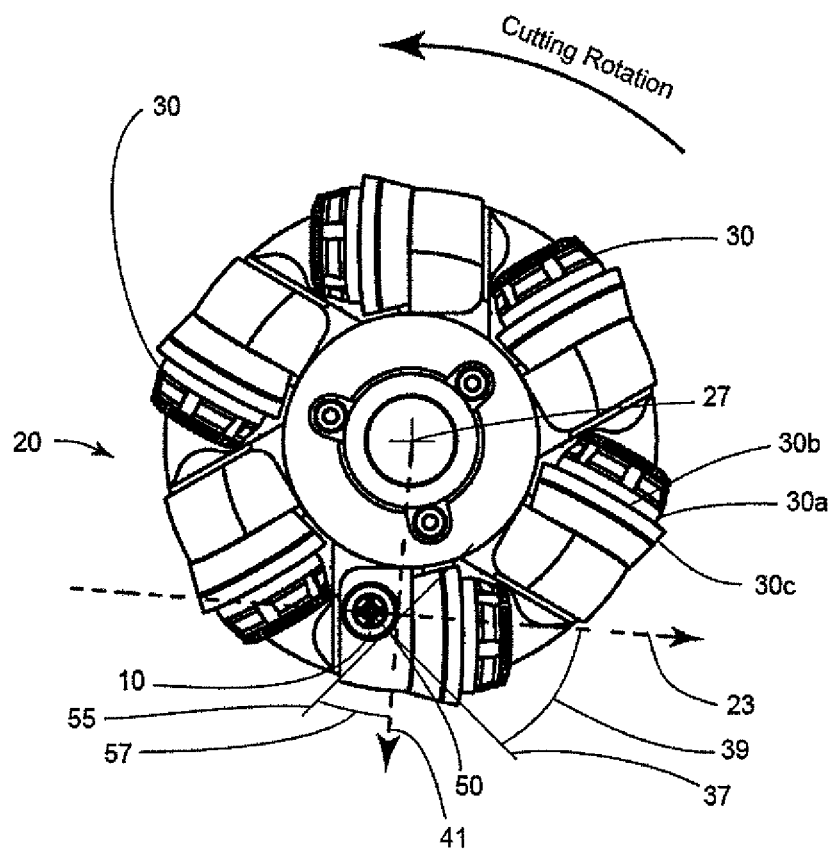
FIG. 3A is an end view of an example embodiment a face mill.
Figure 3B:
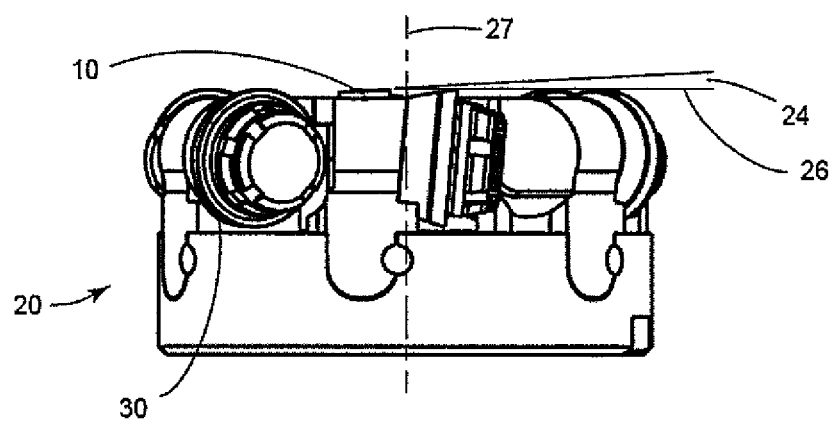
FIG. 3B is a side view of the example embodiment face mill shown in FIG. 4A.

The wiper tooth system that is the subject of this disclosure serves to improve (i.e., decrease) surface roughness. A wiper tooth, including a wiper tooth insert that does the cutting, is generally rectangular, square, triangular, etc. (that is to say, having substantially straight cutting edges around its periphery). A square wiper tooth insert 2 mounted on a mill body 4 is shown in FIG. 1 to form a wiper tooth. A wiper tooth insert of an example embodiment of the present disclosure is round, making use of a round, e.g., circular cutting insert 10 having an insert diameter 12 and insert thickness 14, as shown in FIG. 2. In the shown example embodiment, the wiper tooth insert has a fastener hole 16 and fastener countersink 18 to accommodate a mounting fastener, e.g., a screw (not shown in FIG. 2). The wiper tooth insert has a peripheral cylindrical surface 32 that intersects a face surface 28 along an edge 29 that defines the insert cutting edge. As shown in FIGS. 3A and 3B, the wiper tooth insert 10 is affixed to a face mill body 20 in an orientation such that the wiper tooth insert 10 face surface 28 lies at a first angle 24 from a feed plane 26 when viewed along a direction opposite the radial direction 41 (i.e., when viewing as per FIG. 3B). The feed plane 26 is the plane perpendicular to the face mill axis 27. In example embodiments, the first angle is in the range generally between greater than 0° and 10°.

The Primary Cutting Teeth 30 in this and other example embodiments employ round or circular cutting inserts 30a, but in other embodiments, each primary cutting insert may have other shapes which are not round, as for example, square, triangular, etc. Example circular cutting inserts have outer diameters of 6, 9, 12, 16, 25 or 26 mm. Other size inserts may also be used. Furthermore, in example embodiments, the Primary Cutting Teeth in FIGS. 3A and 3B are of a type that can rotate under the influence of chip formation. In other example embodiments, stationary, fixed primary cutting teeth are mounted on the face mill body. The primary cutting teeth have a flat face 30b and a peripheral surface 30c. Whereas cutting with a round primary cutting tooth insert normally performs chip formation on their flat face 30b of the cutting tooth, referred to as the rake face, with the example embodiment round wiper tooth insert, the chip is formed on the peripheral cylindrical surface 32 of the round/cylindrical wiper tooth insert, which is normally the clearance face when such geometry insert is used as a primary cutting tooth insert. In other words, by laying the round cutting insert nearly flat (i.e., at a shallow angle) on the end of the Face Mill 20, the surfaces of the round insert that normally serve as the rake face (upon which the chip forms) and the clearance face serve the opposite role.

Figure 4A:
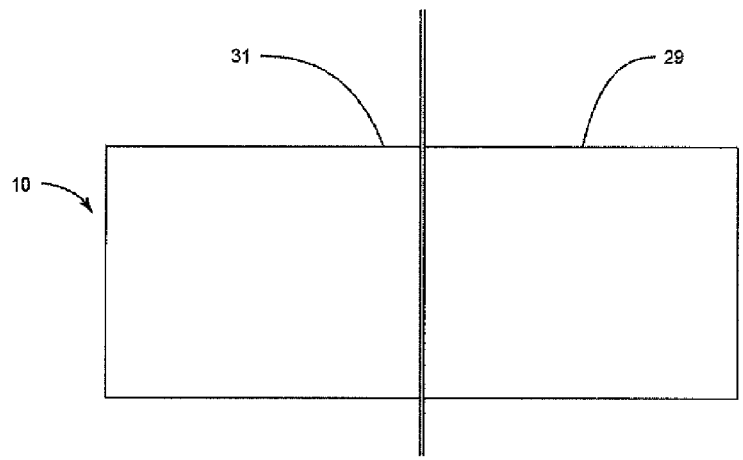
FIGS. 4A and 4B are end views of example embodiment wiper cutting inserts.
Figure 4B:
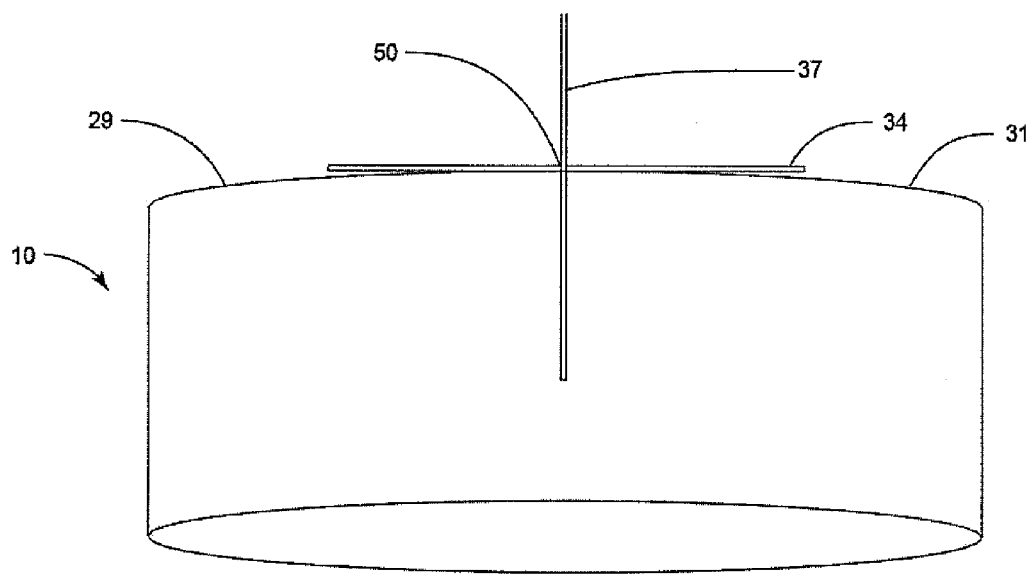

Since the wiper tooth insert is mounted with its face surface 28 at the first angle 24 relative to the feed plane, the cutting edge 29 profile 31 is elliptical when viewed along the feed plane 26 or a plane 34 parallel to the feed plane in a direction opposite a wiper cutting direction 23 (FIGS. 3B and 4B). If the round wiper tooth insert was mounted such that its face 28 was along the feed plane 26 (i.e., the first angle is 0 degrees), then the cutting edge 29 profile 31 would be a straight line when viewed along the feed plane in a direction opposite the wiper cutting direction 23, as for example shown in FIG. 4A. Because the round wiper tooth insert is set at a first angle 24 relative to the feed plane 26, the elliptical profile viewed in the noted direction deviates only slightly from being straight relative to the feed plane (as can be seen by comparing the cutting edge profiles shown in FIGS. 4A and 4B). Thus, the wiper tooth insert cutting edge profile has a large radius of curvature from this viewing perspective. In an example embodiment, the diameter at the cutting edge of the wiper tooth insert used is in the range of about 8 to about 20 mm.

In an example embodiment, the wiper tooth insert of the present disclosure also exhibits a shallow angle, that is at a maximum as measured along a plane 37 through a diameter of the wiper tooth insert, referred to herein for illustrative purposes as a maximum angle plane. In example embodiments, the maximum angle is in the range generally between greater than 0° and 10°. In example embodiments, the maximum angle plane is oriented at an angle 39 in the range of 0° where the maximum angle plane is along the wiper cutting direction 23 to less than 90° as measured in a direction radially outward along a radius 41 of the face mill. In other words, the maximum angle plane is oriented at an angle relative to a radius 41 extending from the mill axis which is tangent to the wiper tooth insert cutting edge, in the range where the maximum angle plane is perpendicular to the radius 41 to an angle less that 90° as measured in a direction radially outwards from the wiper cutting direction 23 along the radius 41. As a result, a point 50 along the elliptical profile 31 of cutting edge 29 that protrudes furthest axially from the face mill body 20 is located radially outward, with, respect to the axis of the face mill, from the wiper cutting direction 23. Cutting of material by the wiper tooth insert will occur relatively symmetrically about this point 50 of furthest axial protrusion of the elliptical cutting edge.

Unlike typical wiper teeth that have their straight cutting edge 53 running substantially radially on the face mill axial end (FIG. 1), the round wiper tooth Insert does not have a straight length of cutting edge. Thus, in an example embodiment, the wiper tooth insert cutting edge disclosed herein does not have a straight edge that runs substantially radially. Instead, at the furthest axial protrusion point 50 of the elliptical profile 31 of wiper insert cutting edge 29, being radially outward (with respect to the face mill axis 27) from the wiper cutting direction 23, a tangent 55 to the wiper tooth insert cutting edge along point 50, is not radial along a face mill radius. The angle 57 between the tangent 55 and the face mill radius 41 is referred to herein as the inclination angle. As the inclination angle 57 becomes non-zero, it will cause the chip to flow to the side; such that the chip will flow radially outward relative to the face mill, which is preferred for evacuating the chips removed by the wiper tooth. Furthermore, this chip flow will result in a torque about the axis of the round wiper tooth insert such that the wiper tooth insert may rotate about the axis of the round wiper tooth insert if the wiper tooth insert is not rigidly affixed, in its torsional degree of freedom, to the face mill body.

Figure 5:
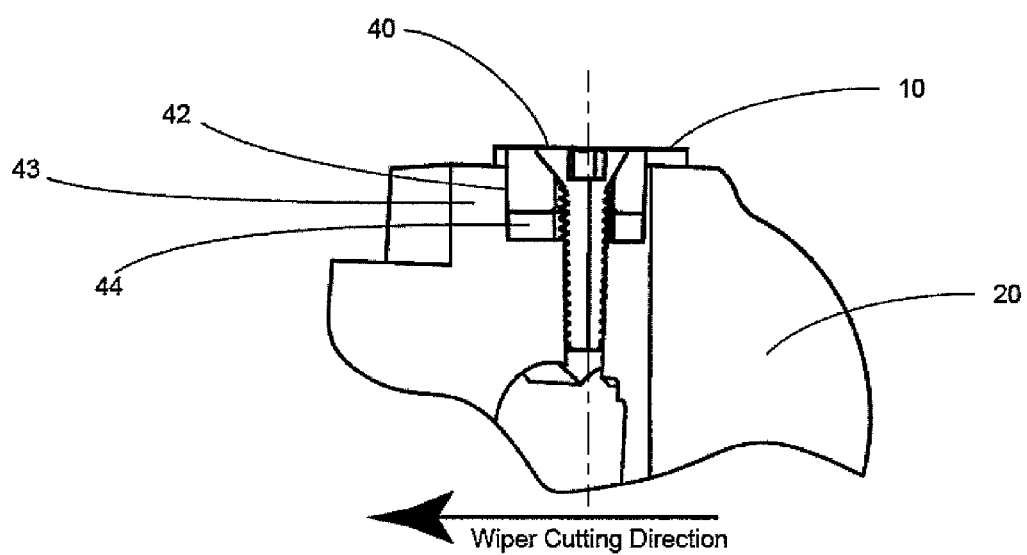
FIG. 5 is a 90° cross-sectional view of a partial section of an example embodiment face mill body with a wiper insert mounted thereon.

In one example embodiment, as shown in FIG. 5, the round wiper tooth insert 10 may be rigidly affixed to the face mill body 20 using an insert mounting screw 40. The wiper tooth insert is located and supported laterally by the walls 43 of an insert receiving bore 42 and from beneath by a stack of one or more adjustment shims 44. Wiper adjustment is achieved by adding and subtracting one or more adjustment shims that are precision ground to desired thicknesses. In this embodiment the wiper tooth insert will generally resist rotation since it is rigidly affixed/clamped to the face mill body resulting from significant clamping force applied by the insert mounting screw and resultant torsional friction to resist rotation of the wiper tooth Insert. In the shown example embodiment, the mounting screw 40 had a countersunk head that is received in the fastener countersink 18 of the wiper tooth insert. The insert receiving bore is oriented at the appropriate angle so that the face of the wiper tooth insert is at the appropriate angle relative to the feed plane.

Figure 6A:
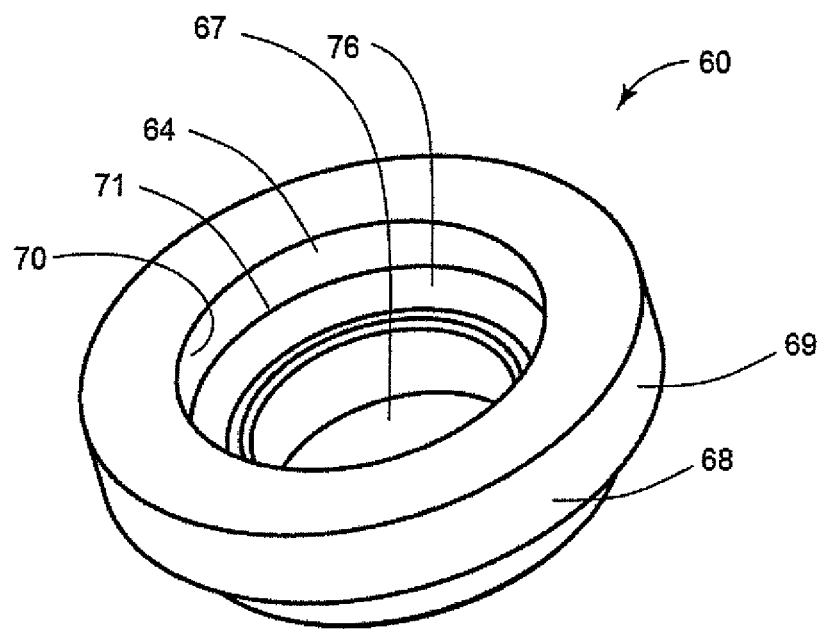
FIGS. 6A and 6B are top and bottom perspective views, respectively, of another example embodiment wiper insert.
Figure 6B:
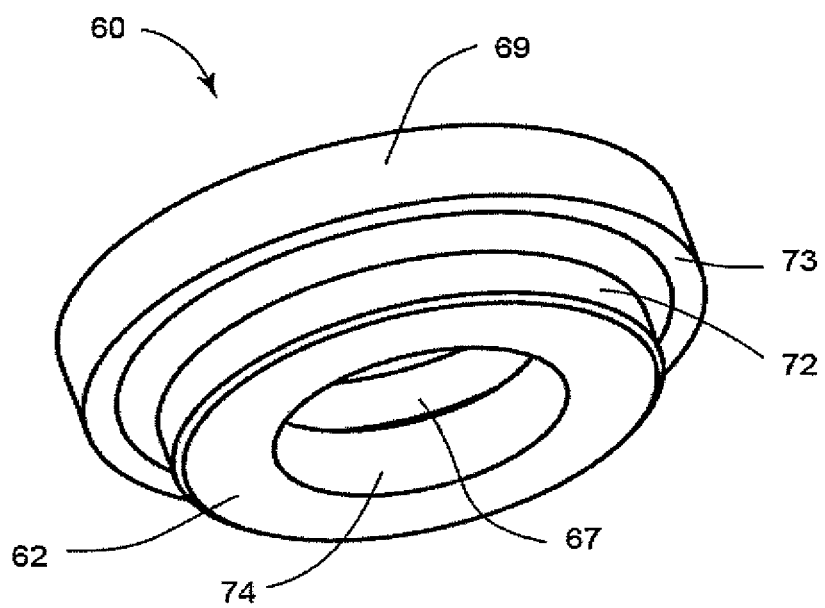

As can be seen in FIGS. 6A and 6B, in another example embodiment, the round wiper insert 60 has a bottom a cylindrical pilot 62 and a nut recess 64 on the opposite end. The insert includes a first annular section 69 defining the nut recess 64 that is coaxial and adjacent to a second annular section that defines the bottom cylindrical pilot 62. An opening 67 extends through both sections. The first annular section includes a first outer surface 68 and a second inner surface 70 opposite the first outer surface. The second annular section includes a third outer surface 72 and a fourth inner surface 74 opposite the third outer surface. The first outer surface diameter is greater than the second inner surface diameter and the third outer surface diameter. The third outer surface diameter is smaller than the first outer surface diameter but greater than the second and fourth inner surface diameters. The fourth inner surface diameter is smaller than the second inner surface diameter. In this regard, a seat 76 is defined by the second section. The intersection 71 between the seat and the fourth inner surface 70 may be rounded for accepting an O-ring seal. As the second annular section is smaller in diameter than the first annular section is defines the pilot.

Figure 7:
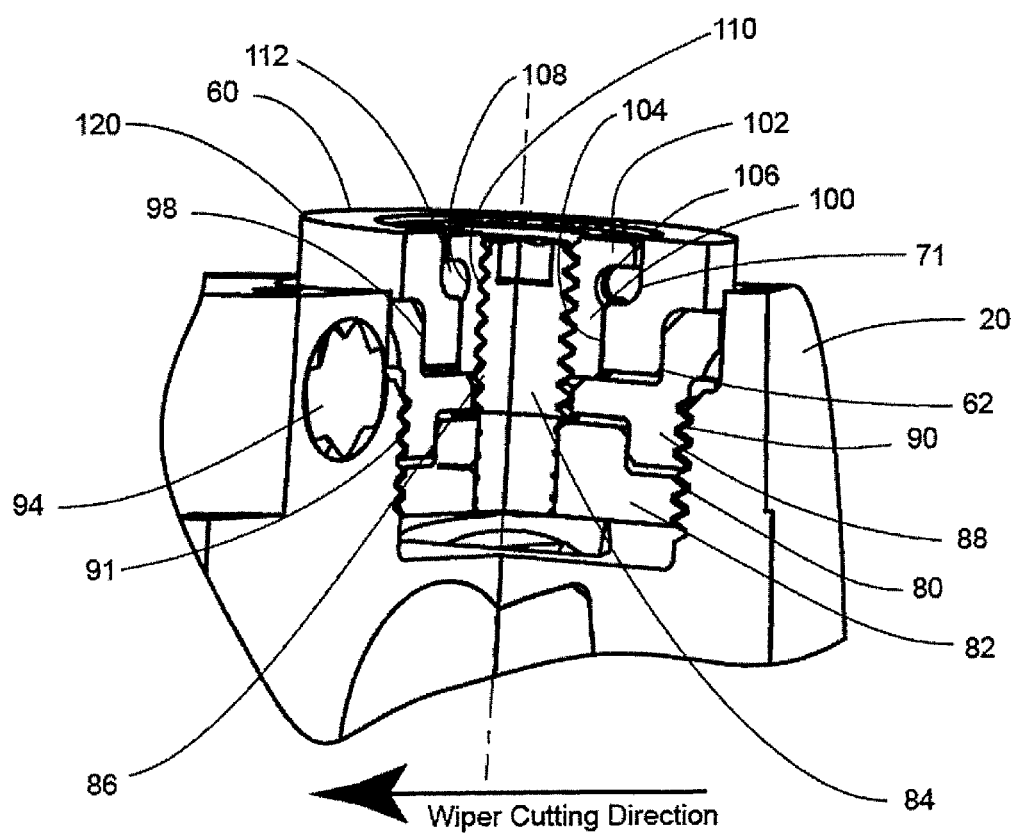
FIG. 7 is a 90° cross-sectional view of a partial section of an example embodiment face mill body with the wiper insert shown in FIGS. 6A and 6B mounted thereon.

In another example embodiment, as shown in FIG. 7, the round wiper insert 60 is connected to the face mill body 20, as follows. A threaded bore 80 is formed on the body. A seat clamp 82 is threaded into the bore 80. A seat clamp stud 84 is fixed to the seat clamp or may be integrally formed with the seat clamp. The seat clamp stud 84 has a threaded outer surface 86. An annular insert seat 88 has an outer surface 90 having at least a portion 91 that is threaded. The outer surface also has a plurality of gear teeth (not shown). In an example embodiment the gear teeth are longitudinal and they mesh with a worm gear 94 defining an adjustment screw. The outer threaded surface portion 91 is threaded into the bore 80. The insert seat defines a receptacle 98 receiving the insert pilot 62.

When the insert pilot 62 is inserted into the receptacle 98, the seat clamp stud penetrates the insert opening 67. An insert retention nut 100 is then threaded onto the stud outer surface 86 for retaining the insert on the stud. The insert retention nut is an annular nut having a first larger diameter section 102 coaxially adjacent a second smaller diameter section 104. A face 106 is defined by a portion of the first larger diameter section 102 extending radially beyond the smaller diameter section 104. A pocket 108 may be formed at the intersection of the two sections for receiving a seal such as an O-ring. A threaded opening 110 extends through both sections. The insert retention nut is threaded on clamp stud such that clamp stud is threaded onto the threaded opening 110. In the absence of the pocket 108 and O-ring seal, the insert retention nut is threaded until the face 106 exerts a force on the seat 76 of the insert for retaining the insert against the insert seat. In an example embodiment, the overall length of the insert retention nut is such that the insert retention nut provides sufficient force against the insert seat for clamping the insert in position without the insert retention nut engaging the insert seat. In this embodiment, the insert may not be able to rotate and a seal may not be used. In such case the rounded intersection on the insert and the pocket on the insert retention nut may not be necessary. In an example embodiment an O-ring seal 112 is placed in the pocket 108 and is sandwiched against the rounded intersection between the seat and the fourth inner surface 70 of the insert. In another example embodiment a longer insert retention nut may be used such that the insert retention nut contacts the insert seat prior to providing sufficient force for clamping the insert for preventing rotation of the insert. With this embodiment, an O-ring seal 112 is placed in the pocket 108 and is sandwiched against the rounded intersection between the seat and the fourth inner surface 70 of the insert. The insert retention nut face clamps the O-ring seal against the insert seat with lesser pressure as the insert retention nut is prevented from exerting further pressure by the insert seat. With this example embodiment, the 0-ring is made of a material with low enough coefficient of friction with the insert surface, the wiper insert will be located and restrained axially but not restrained rotationally and may therefore rotate due to the aforementioned side chip flow during cutting. The wiper insert rotation may be continuous or intermittent, that is, in small steps of rotation upon entry and exit of the wiper tooth with the work piece, face milling being an intermittent process. Any sort of wiper insert rotation brings the advantage of automatically spreading wear of the wiper insert around its entire circumference. If this were not the case, the wiper insert would have to be manually indexed by, say for example 20°, whenever it became excessively worn. That would require 360°/20°=18 indexes over the life of the wiper insert. Allowing rotation, in this example, eliminates seventeen indexes, saving substantial tool-setting time and machine downtime.

To adjust the position of the insert cutting face, the adjustment screw is rotated causing the insert seat to rotate relative to the clamp stud and thus move axially relative to the clamp stud moving the insert with it. In an example embodiment, the adjustment of the wiper insert depth takes place as follows: (1) slightly loosen the insert retention nut with a wrench that fits into the holes on the top surface of the nut (not shown) while holding stationary the seat clamp stud that is rigidly affixed to the seat clamp; doing this releases the axial clamping action of the seat clamp, which achieves its clamping action by pinching the threads in the threaded bore 80, (2) turn the adjustment screw to rotate the insert seat and seat clamp (both threaded into the threaded bore 80) so they move up and down until the proper wiper depth is achieved, (3) retighten the insert retention nut (which draws the seat clamp up to re-pinch the threads in the threaded bore 80). A high pitch (gear ratio) of the adjustment screw, compounded with the thread pitch of the threaded receiving bore results in an extremely fine adjustment ratio, which is desirable.

In an example embodiment, the threaded bore 80 is positioned such that when the wiper insert fixed thereto, the insert face is at the appropriate angle relative to the feed plane.

In example embodiments, the insert retention nut and the seat clamp stud do not extend to the level of the face 120 of the insert or may extend up to the level of the insert face. Similarly, in FIG. 5 the head of the insert mounting screw extends to the level or below the level of the insert face 28. In this regard, the insert retention nut, the clamp stud or the mounting screw do not gouge the machined surface.

Although the present disclosure has been illustrated to include a wiper tooth including a wiper tooth insert, the present disclosure also includes wiper teeth that are formed on the face mill body that to do not incorporate an insert. In other words, the wiper tooth insert described herein is integrally formed with the mill body to define the wiper tooth. In example embodiments, mill bodies are provided including a wiper tooth having a round cutting edge as described herein. In example embodiments such wiper cutting teeth include a face 28 and peripheral surface 32 defining a cutting edge 29 which in example embodiments have an elliptical profile 31 as described in relation to the wiper tooth insert herein.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A milling tool comprising:
    a body, said body being rotatable about a first axis;
    at least one cutting tooth mounted on the body having a cutting edge for cutting about said first axis; and
    a wiper tooth comprising a round wiper cutting insert, said insert being round about a second axis and having a peripheral surface about said second axis; wherein said peripheral surface intersects a face surface defining a cutting edge that is round about said second axis for cutting about said first axis, wherein said wiper cutting insert cutting edge is formed along a first plane offset at a first angle relative to a second plane perpendicular to said first axis and below said first plane, wherein said first angle is formed along a third plane perpendicular to said first and second planes, wherein a body radius extends perpendicularly from said first axis, said body radius being tangent to said wiper cutting insert cutting edge, wherein said third plane is axially along a diameter of the wiper tooth cutting insert, wherein said third plane extends at a third plane angle relative to the body radius, said third plane angle being in a range of angles as measured from a wiper tooth radius extending perpendicular from said body radius in a direction of cutting to an angle less than 90° as measured from said wiper tooth radius in a direction outward toward the body radius, wherein the third plane intersects said cutting edge at a point, wherein said point is furthest axially from the second plane than any other point on said cutting edge.

2. The milling tool of claim 1, wherein the first angle is in the range of greater than 0° to 10°.

3. The milling tool of claim 1, wherein the wiper insert is circular and is rotatable about said second axis.

4. The milling tool of claim 1, wherein the wiper insert is circular and fixed about said second axis.

5. The milling tool of claim 1, wherein the wiper tooth cutting insert comprises a first annular section adjacent a second annular section defining a wiper tooth opening through both sections wherein the first annular section comprises a first outer surface having a first outer diameter and a second inner surface opposite the first outer surface and having a second inner diameter, and wherein the second annular section comprises a third outer surface having a third outer diameter and a fourth inner surface opposite the third outer surface and having a fourth diameter, wherein the third diameter is greater than the second diameter but smaller than the first diameter, wherein the fourth diameter is smaller than the second diameter, wherein a seat is defined between the second and fourth inner surfaces and wherein the first outer surface is said peripheral surface.

6. The milling tool of claim 5 further comprising:
    a stud coupled to the mill body and penetrating the wiper tooth opening; and
    a retention nut comprising first annular section having an outer surface and a second annular section coaxial with the retention nut first annular section having an outer surface defining an opening through said retention nut, wherein a diameter of the outer surface of the retention nut second annular section is smaller than a diameter of the retention nut first annular section outer surface, wherein the first annular section extends radially beyond the second annular section defining a face there-between, and wherein said retention nut is fitted in the opening of said wiper tooth insert with retention nut first annular section outer surface being adjacent to said second inner surface and the retention nut second annular section outer surface being adjacent to the fourth inner surface for retaining said wiper insert on said mill body.

7. The milling tool as recited in claim 6, wherein the mill body comprises a threaded bore, wherein the stud extends from a seat that is threaded into the threaded bore, the tool further comprising:
    an insert seat having an inner surface penetrated by the stud and an outer surface threaded to the bore, said insert seat defining a receptacle receiving said wiper tooth insert second section;
    a gear coupled to the body and to the insert seat, wherein rotation of the gear causes the seat rotate relative to the bore and translate relative to the stud for adjusting the position of the wiper tooth cutting insert relative to the stud.

8. The milling tool as recited in claim 7, wherein the gear rotates about an axis transverse to the axis of rotation of the insert seat relative to the stud.

9. The milling tool as recited in claim 7, further comprising a seal sandwiched between the retention nut face and the wiper tooth insert seat.

10. The milling tool as recited in claim 9, wherein said wiper tooth insert is rotatable about said second axis during operational milling use of said milling tool.

11. The milling tool as recited in claim 7, wherein the retention nut is threaded onto said stud.

12. The milling tool as recited in claim 1, wherein the wiper tooth cutting insert is fastened to the mill body with a fastener penetrating through an opening formed through the wiper tooth insert.

13. A milling tool comprising:
a body, said body being rotatable about a first axis;
at least one cutting tooth mounted on the body having a cutting edge for cutting about said first axis; and
a wiper tooth, said wiper tooth comprising at least a portion being round about a second axis and having a peripheral surface about said second axis; wherein said peripheral surface intersects a face surface defining a cutting edge that is round about said second axis for cutting about said first axis, wherein said wiper cutting insert cutting edge is formed along a first plane offset at a first angle relative to a second plane perpendicular to said first axis and below said first plane, wherein said first angle is formed along a third plane perpendicular to said first and second planes, wherein a body radius extends perpendicularly from said first axis, said body radius being tangent to said wiper cutting insert cutting edge, wherein said third plane is axially along a diameter of the wiper tooth cutting insert, wherein said third plane extends at a third plane angle relative to the body radius, said third plane angle being in a range of angles as measured from a wiper tooth radius extending perpendicular from said body radius in a direction of cutting to an angle less than 90° as measured from said wiper tooth radius in a direction outward toward the body radius, wherein the third plane intersects said cutting edge at a point, wherein said point is furthest axially from the second plane than any other point on said cutting edge.

14. The milling tool of claim 13, wherein the first angle is in the range of greater than 0° to 10°.

15. The milling tool of claim 1, wherein a tangent to said point is not along a radius extending from the first axis.

16. The milling tool of claim 13, wherein a tangent to said point is not along a radius extending from the first axis.

17. A milling tool comprising:
a body, said body being rotatable about a first axis;
at least one cutting tooth mounted on the body having a cutting edge for cutting about said first axis;
a wiper tooth comprising a round wiper cutting insert, said insert being round about a second axis and having a peripheral surface about said second axis, wherein said peripheral surface intersects a face surface defining a cutting edge that is round about said second axis for cutting about said first axis, wherein the wiper tooth cutting insert comprises a first annular section adjacent a second annular section defining a wiper tooth opening through both sections wherein the first annular section comprises a first outer surface having a first outer diameter and a second inner surface opposite the first outer surface and having a second inner diameter, and wherein the second annular section comprises a third outer surface having a third outer diameter and a fourth inner surface opposite the third outer surface and having a fourth diameter, wherein the third diameter is greater than the second diameter but smaller than the first diameter, wherein the fourth diameter is smaller than the second diameter, wherein a seat is defined between the second and fourth inner surfaces and wherein the first outer surface is said peripheral surface;
a stud coupled to the mill body and penetrating the wiper tooth opening;
a retention nut comprising first annular section having an outer surface and a second annular section coaxial with the retention nut first annular section having an outer surface defining an opening through said retention nut, wherein a diameter of the outer surface of the retention nut second annular section is smaller than a diameter of the retention nut first annular section outer surface, wherein the first annular section extends radially beyond the second annular section defining a face there-between, and wherein said retention nut is fitted in the opening of said wiper tooth insert with the nut first annular section outer surface being adjacent to said second inner surface and the retention nut second annular section outer surface being adjacent to the fourth inner surface for retaining said wiper insert on said mill body, wherein the mill body comprises a threaded bore, wherein the stud extends from a seat that is threaded into the threaded bore;
an insert seat having an inner surface penetrated by the stud and an outer surface threaded to the bore, said insert seat defining a receptacle receiving said wiper tooth insert second section; and
a gear coupled to the body and to the insert seat, wherein rotation of the gear causes the seat rotate relative to the bore and translate relative to the stud for adjusting the position of the wiper tooth cutting insert relative to the stud.

18. The milling tool as recited in claim 17, wherein the gear rotates about an axis transverse to the axis of rotation of the insert seat relative to the stud.

19. The milling tool as recited in claim 17, further comprising a seal sandwiched between the retention nut face and the wiper tooth insert seat.

20. The milling tool as recited in claim 19, wherein said wiper tooth insert is rotatable about said second axis during operational milling use of said milling tool.

21. The milling tool as recited in claim 17, wherein the retention nut is threaded onto said stud.

* * * * *